US009270107B2

(12) United States Patent
Juha et al.

(10) Patent No.: US 9,270,107 B2
(45) Date of Patent: Feb. 23, 2016

(54) METHOD AND AN APPARATUS FOR SUPERVISION OF CURRENT TRANSFORMER IN A DIFFERENTIAL PROTECTION SYSTEM

(71) Applicant: ABB TECHNOLOGY LTD, Zurich (CH)

(72) Inventors: Ylinen Juha, Vaasa (FI); Shah Nayan, Vadodara (ID); Kandakatta Murali, Atmaku (ID)

(73) Assignee: ABB TECHNOLOGY LTD, Zürich (CH)

( * ) Notice: Subject to any disclaimer, the term of this patent is extended or adjusted under 35 U.S.C. 154(b) by 421 days.

(21) Appl. No.: 13/920,653

(22) Filed: Jun. 18, 2013

(65) Prior Publication Data
US 2013/0279048 A1 Oct. 24, 2013

Related U.S. Application Data

(63) Continuation of application No. PCT/IB2011/001318, filed on Jun. 10, 2011.

(51) Int. Cl.
H02H 3/00 (2006.01)
H02H 7/04 (2006.01)
H02H 7/045 (2006.01)

(52) U.S. Cl.
CPC ............ H02H 7/042 (2013.01); H02H 7/045 (2013.01)

(58) Field of Classification Search
CPC ................. H02H 7/042; H02H 7/045
See application file for complete search history.

(56) References Cited

U.S. PATENT DOCUMENTS

2006/0198073 A1 9/2006 Cvorovic
2010/0202092 A1 8/2010 Gajic et al.

FOREIGN PATENT DOCUMENTS

EP 1 696 531 A2 8/2006

OTHER PUBLICATIONS

International Search Report (PCT/ISA/210) issued on Nov. 18, 2011, by the Belgian Patent Office as the International Searching Authority for International Application No. PCT/IB2011/001318.

Primary Examiner — Thienvu Tran
Assistant Examiner — Tien Mai
(74) Attorney, Agent, or Firm — Buchanan Ingersoll & Rooney PC

(57) ABSTRACT

A method and device are disclosed for supervising the operation of plural current transformers and for prevention of a malfunction, such as false tripping of power in an electrical system. Exemplary embodiments can include measuring current parameters (e.g., magnitude and phase angle) for each winding in current transformer (CT) sets. A negative sequence current can be calculated from measured phase currents and a fault condition determined. A phase angle difference parameter derived from phase measurements between two healthy CTs can be used as an additional condition parameter for reliable operation of equipment in the electrical system.

17 Claims, 6 Drawing Sheets

METHOD AND AN APPARATUS FOR SUPERVISION OF CURRENT TRANSFORMER IN A DIFFERENTIAL PROTECTION SYSTEM

RELATED APPLICATION

This application claims priority as a continuation application under 35 U.S.C. §120 to PCT/IB2011/001318, which was filed as an International Application on Jun. 10, 2011 designating the U.S., and which claims priority to Indian Application 4046/CHE/2010 filed in India on Dec. 31, 2010. The entire contents of these applications are hereby incorporated by reference in their entireties.

FIELD

The present disclosure relates to a method and apparatus for supervising the operation of a plurality of current transformers, and to prevention of malfunction, such as the false tripping of power in an electrical system.

BACKGROUND

Power transformers are considered prime power equipment in an electrical power system, and faults in power transformers may lead to major consequences, both in terms of power failure for large groups of customers and in the terms of cost/time associated with the repair or replacement of a transformer. Major power equipment has been protected against faults with use of protection devices. These devices detect various fault conditions in the power system and provide trip signals to circuit breakers associated with power equipment to isolate the faulty equipment or the protected power equipment from the system.

In the present disclosure, a protection device may also be referred to as an intelligent electronic device (IED), protection relay or simply as a relay. One of the protection devices for power equipment is a differential relay. Known power transformer differential relays can utilize individual phase currents from different windings of the transformer in order to form the phase-based differential currents to monitor faults in the power transformer or the power system and protect the power transformer. The individual phase currents from different windings can be measured with the help of a current transformer (CT) connected in the path of each winding of the power transformer.

An exemplary technique for detecting abnormal operating conditions, such as unbalanced conditions in a power transformer (for example, applicable for any three phase equipment and transmission system) and resulting faults due to unbalanced operation, is to use phase sequence information (for example negative sequence currents). To provide protection, the protection relay should provide a trip signal to its respective circuit breaker before any damage or degradation can occur in the power equipment. Performance within one AC cycle time (power cycle) is, for example, desired.

Failure in a CT (for example, CT secondary winding failure by breakage or winding disconnections), can cause malfunction of the protective relays resulting in false tripping (spurious operation). Thus, the detection of an abnormal operating condition in the system may not be authentic.

Further, in modern numerical multifunction protection relays, CT secondary failure can also cause malfunctioning of other protection functions (such as a broken primary conductor protection) or can pose a safety hazard because of high voltage build up at the terminal as a result of breakage in a CT secondary winding/connection.

Detection of an authentic abnormal operating condition (e.g., faults) for transformers can be carried out by additionally monitoring other parameters or derivable values from these additional measurements (e.g., current/voltage) made in the system. Some examples are use of voltage values as a reference together with the monitored electrical current values, use of current values from another CT as a reference, and so forth. These arrangements involve an additional channel in the IED to supply a reference voltage or current to the IED.

An example is provided to illustrate the difficulty in supplying a reference voltage or current signal to the protection relay. Here, the CT secondary supervision is performed with use of a separate reference current input but the reference CT input would be needed for each CT set separately, thus making it a rather expensive solution and more difficult to integrate into the protective relay.

In a three winding differential protection relay, 12 CT inputs would be used to cover both the protection specifications (9CT) and the CT secondary supervision specifications (3CT) at the same time. Some known solutions use voltage as a reference for the current in detection of CT secondary failure, but also this solution can involve some extra measurements on top of the differential protection itself.

SUMMARY

A method is disclosed for supervising a condition of electrical equipment in an electrical power system which includes plural current transformers for multi-phase power equipment, the multi-phase power equipment being protected by a protection relay which can issue of a trip signal on occurrence of a fault in the electrical power system, the method comprising: measuring electrical parameters from the plural current transformers for the multi-phase power equipment; computing a fault indicative parameter for the multi-phase power equipment in the electrical power system from the measurements made with the plural current transformers; detecting a fault condition in at least one electrical measurement made from the plural current transformers, wherein a current transformer indicating a fault condition is a suspected faulty current transformer and remaining current transformers of the plural current transformers are considered to be healthy current transformers; detecting a change in the computed fault indicative parameter from the at least one electrical parameter measurement made from at least one of the healthy current transformers on detection of the fault condition in the suspected faulty current transformer; and comparing the detected change in the computed fault indicative parameter with a preset threshold value for the fault indicative parameter to determine a condition of at least one electrical equipment component in the electrical power system; wherein the computing of the fault indicative parameter includes computing a condition parameter selected from a group consisting of: a negative sequence current parameter computed from measurements made with at least one healthy current transformer, a phase angle difference parameter computed from measurements between current signals from any two of the healthy current transformers, and a combination parameter set based on the negative sequence current parameter and the phase angle difference parameter.

A device is also disclosed for supervision of a condition of electrical equipment in an electrical power system having plural current transformers and multi-phase power equipment, where the plural current transformers can measure current in the multi-phase power equipment, the device comprising: a current sensing module for measuring current parameters and for detecting a fault condition in measurements made from the at least one suspected faulty current transformer; a computation module for computing change in a fault indicative parameter value based on data from at least one healthy current transformer as provided by the current sensing module; and a comparator module for comparing a change in the fault indicative parameter with a preset threshold value to determine a condition of at least one electrical equipment component in the electrical power system; wherein the computation module is configured to compute a fault indicative parameter by computing a condition parameter selected from a group consisting of: a negative sequence current parameter computed using the at least one healthy current transformer, a phase angle difference parameter computed from measurements between current signals from any two healthy current transformers from among the plural current transformers, and a combination parameter set based on the negative sequence current parameter and the phase angle difference parameter.

BRIEF DESCRIPTION OF THE DRAWINGS

These and other features, aspects, and advantages will become better understood when the following detailed description is read with reference to the accompanying drawings in which like characters represent like parts throughout the drawings, and wherein.

DETAILED DESCRIPTION

Figure 1:
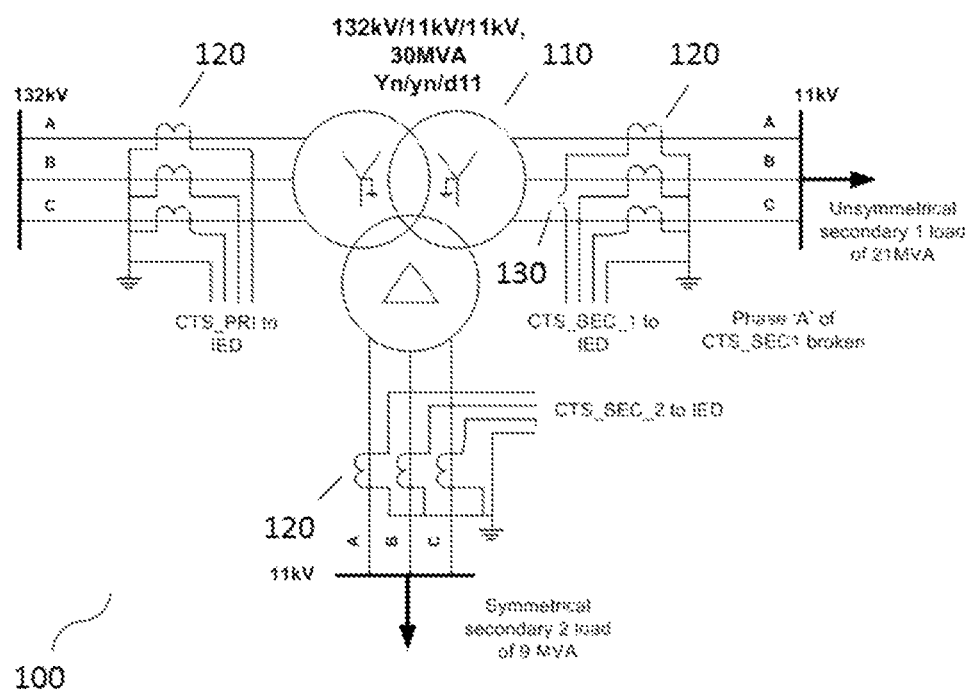
FIGS. 1-4 are exemplary electrical power systems having faults in electrical power equipment.

The present disclosure is directed to a solution that makes use of signals or measurements provided for a differential protection relay to detect authentic abnormal conditions in protected power equipment.

A method and a device are disclosed for detection of an authentic abnormal operating condition for differential protection of three phase electrical equipment. The method and the device can provide supervision of an abnormal condition in current transformers used in an electrical system to provide measurements for differential protection and thus to enable a differential protection device to initiate trip procedures for authentic faults affecting the three phase electrical equipment.

In an exemplary aspect, a method is disclosed for supervising the operation of a plurality of current transformers (CTs) used along with a protection relay for protection of multi-phase power equipment. The method used by the protection relay can comprise:

a) Measuring electrical parameters (e.g., current magnitude and phase) from the plurality of current transformers for the multi-phase power equipment;

b) Computing a fault indicative parameter for the multi-phase power equipment in the electrical power system from the measurements made with-the plurality of current transformers;

c) Detecting a current zero state (fault condition) in at least one electrical measurement made from the plurality of current transformers, where the current transformer providing current or voltage zero state is considered to be a suspected faulty current transformer and the other current transformers from among the plurality of the current transformers are considered to be healthy current transformers;

d) Detecting a change in the computed fault indicative parameter from the at least one electrical parameter measurement made from at least one of the designated healthy current transformers on detection of the current zero state in the suspected faulty current transformer; and e) Comparing the detected change in the computed fault indicative parameter with a preset threshold value for the fault indicative parameter to determine the condition of at least one electrical equipment component in the electrical power system.

The fault indicative parameter can be one of the condition parameters selected from a group comprising (e.g., consisting of) a negative sequence current parameter computed from measurements made with at least one healthy current transformer, a phase angle difference parameter computed from measurements between current signals from any two healthy current transformers from the plurality of current transformers, and a combination parameter set based on the negative sequence current parameter and the phase angle difference parameter. The combination parameter set can have multiple preset threshold values corresponding to the parameter set and can be a derived parameter based on an expression comprising (e.g., consisting of) a negative sequence current parameter and the phase angle difference parameter. The selection of a condition parameter as a fault indicative parameter can, for example, be made based on a loading condition in the power equipment.

In an exemplary embodiment, a change in the computed negative sequence current can be detected by comparing the current value of the negative sequence current magnitude with a previous value stored in the memory of the protection relay. The health state of the current transformer/multi-phase power equipment can be determined based on comparison of the change in the computed negative sequence current with a pre-defined, or preset, threshold value. For the purpose of computation, the healthy current transformers in the system can be used.

In addition to the negative sequence current values, the change in phase angles of current signals from the healthy current transformer can also be considered, such as in a condition where the change in the current magnitude may be small due to poor loading of the transformer. The health state of the current transformer can, for example, be considered faulty if the value of change in the computed negative sequence current or the change in the phase angle is smaller than the pre-defined or preset threshold value; else the fault is attributed to the power equipment (e.g., it is not considered a CT fault).

In another exemplary aspect, a relay for protection of a multi-phase power equipment in a electrical power system that is adapted for supervision of operation of one or more current transformers used for measurement of current in the multi-phase power equipment is provided. The adaptation may be carried out by additional algorithmic or hardware/firmware solutions provided entirely in the relay or with other supporting/collaborating automation devices (e.g., other IEDs or servers used in the distribution or substation network).

In an exemplary embodiment, the relay can comprise:

a) A current sensing module (e.g., specially programmed processor) for measuring current parameters from the one or more current transformers and for detecting a current zero state in any of the measurements made from the one or more current transformers;

b) A computation module (e.g., specially programmed processor) for computing a change in a negative sequence current value for the multi-phase power equipment in the electrical power system based on the data provided by the current sensing module on the detection of current zero state;

c) A comparator module (e.g., specially programmed processor) for comparing the change in at least one negative sequence current value and/or the change in phase angles from measurements from at least two current transformers, wherein the two current transformers are different from the current transformer associated with the current zero state, with corresponding preset threshold values, to determine the health state of the current transformer associated with the current zero state; and/or d) A blocking module (e.g., specially programmed processor) for internal blocking of trip signal generated for protection of the multi-phase power equipment based on the result from the comparator module.

In another exemplary embodiment, a relay can compute, respectively, preset threshold values for comparison with a change in a negative sequence current value from a healthy CT and for comparison with the change in phase angles adaptively based on statistical techniques applied on the data gathered during normal (e.g., standard operation when no fault exists) operation of the electrical power system. This feature is useful to have automatic settings and for reliable measurements in power equipment that is unbalanced and poorly loaded.

An exemplary application is not limited to any specific system or power equipment, but can be used in connection with various electric three-phase AC power equipment where numerical differential protection is used.

Exemplary embodiments can introduce a numerical method for detecting CT secondary failure that operates with known CT inputs that are specified for protection functions. It can be fast, independent of the transformer vector group and can distinguish CT secondary failure from other primary system faults (e.g., a broken primary conductor). The method can use a fast, sub cycle, measuring principle to detect possible CT secondary failure using "current zero" criteria (in the faulty CT set), thus making it fast enough to block the protection functions before false tripping.

The method can also monitor a change in negative sequence current ($\Delta I2$) in healthy CT sets, thus making it sensitive to primary system faults (e.g., a broken primary conductor) and can also be effective under low load conditions.

Another exemplary advantage of using a change of negative sequence current ($\Delta I2$) principle is an ability to make the threshold independent of the varying negative sequence current levels introduced by the varying transformer loading conditions.

FIGS. 1-4 show an exemplary measurement system for protection having a three-winding power transformer 110 where three CT sets 120 are used for connection into the apparatus (not shown) that is performing CT secondary failure supervision with the three CT sets. The apparatus in addition may also be providing protection (e.g., transformer differential protection) to the power transformer.

FIG. 1 indicates an example of broken phase 'A' 130 in CT secondary 1. Power transformer loading is asymmetrical and thus the change of loading also introduces some varying negative sequence current levels in different windings in normal operation when no primary or secondary fault exists.

Figure 5:
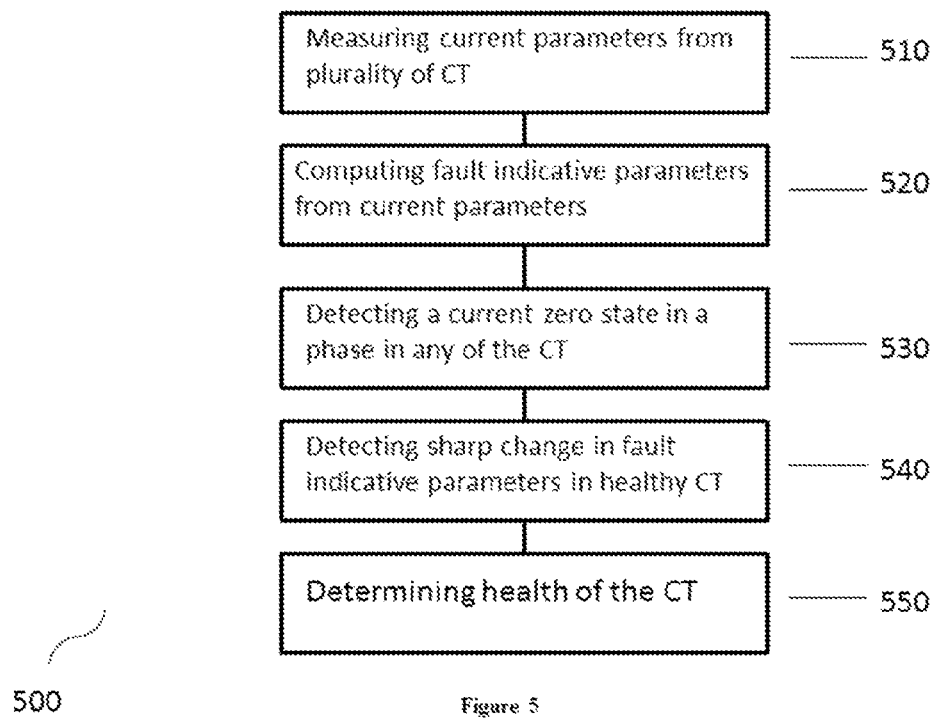
FIG. 5 illustrates an exemplary method for determining CT failure in a manner as disclosed herein.

FIG. 5 illustrates a method, 500, used according to an exemplary embodiment. Current parameters (magnitude and phase angle) are measured (step 510) for each phase current separately from each winding with the CT sets (triplets). Negative sequence current (12), step 520, a condition parameter, is further calculated for each CT set from measured phase currents by the differential protection relay (not shown in FIG. 1). There should be sufficient a sufficient amount of current passing in at least two CT sets, one in the CT set where CT secondary failure is detected and another one operating as a reference (healthy CT set) to make reliable measurements. Depending on the load conditions, there may be several healthy CT sets available as a reference, but at least one is desired for the method described, and the reference CT set may be selected dynamically with a computer program or defined as part of pre-configuration.

The differential protection relay in step 530 detects current zero state, arising from for example, a fault condition due to CT secondary failure, and computes a change in the negative sequence current (step 540) from measurements made with the reference healthy CT in the electrical system. The extent of the change in the negative sequence current can be used for determining the health of the CT depicting current zero state and that of the three phase power transformer (step 550).

Figure 6:
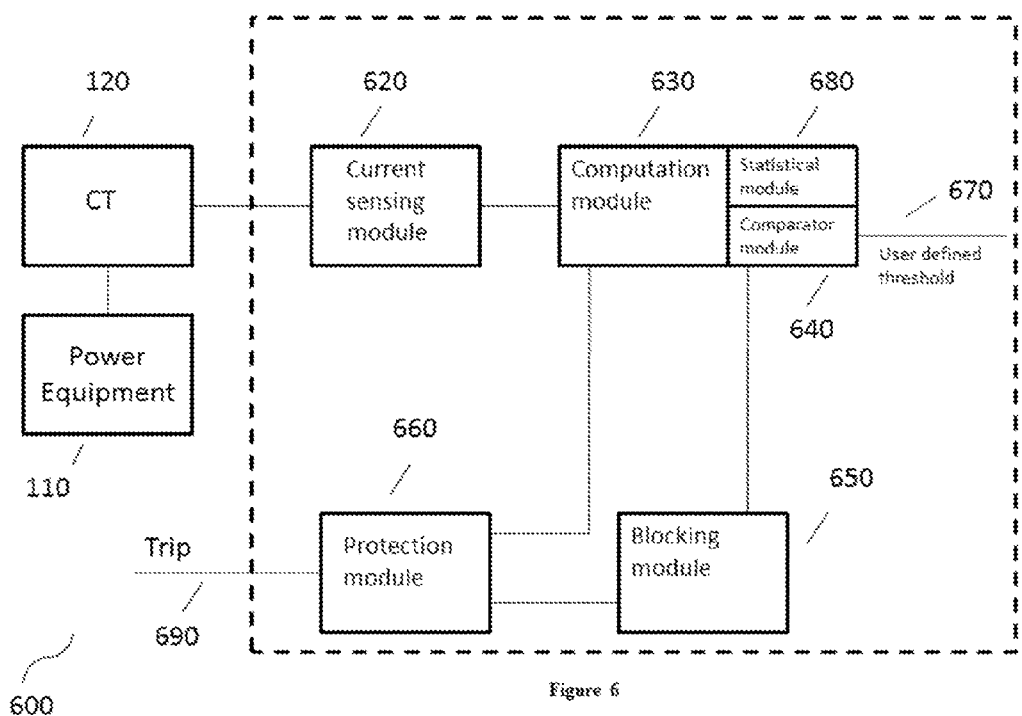
FIG. 6 illustrates an exemplary embodiment of an apparatus as disclosed herein for determining CT failure.

In another exemplary embodiment, illustrated with FIG. 6, the electrical system 600 for performing CT supervision is provided. The apparatus 610 is electrically connected to measure current parameters provided by the CTs 120. The apparatus (relay) has the current sensing module 620 to measure current and also detect current zero state (fault condition). Negative sequence levels are calculated by the computation module 630 in the relay and the value is updated continuously in the memory of the relay during normal load conditions (e.g., when there is no primary system fault detected or CT secondary failure detected). Current zero condition (also referred to as current zero state) is continuously monitored for each phase measured with a raw sample based measuring algorithm. This algorithm provides dedicated sub cycle raw samples to detect current zero within one fundamental power system period, thus providing fast enough blocking information to prevent false tripping of the protective relay. Here, continuous or large numbers of zero values (current zero) are detected within a sub power cycle.

Processing of the measured signals includes use of a numerical peak measuring filter where the window length of samples in the filter can be set greater than or equal to the number of samples in an AC power system half cycle. However, the window length/size is, in exemplary embodiments, always set less than the number of samples for full cycle. The numerical peak measuring filter is designed to capture any instantaneous fast change or interruption in the signals.

After current zero, in any phase, has been determined and confirmed, CT secondary failure is determined by comparing the change of negative sequence current ($\Delta I2$) in a healthy CT set as a reference against a pre-defined threshold (carried out by comparator module 640). In case a threshold is not exceeded, the CT secondary failure is confirmed. A threshold value can be selected to suit the desired sensitive level and the value should consider the normal measuring errors in $\Delta I2$, involved in measurement and computations. The threshold value may be set by the operator as an independent setting 670 or may be adaptively based (for example, using statistical methods) from the history of the measurements performed in normal (no faults) conditions, carried out by statistical threshold module 680.

The relay has a protection module 660 configured to provide trip signals under various fault conditions for which the relay is configured. For CT failures, by using the method described herein, the trip signal generated by the protection module 660 may be internally blocked with the blocking module 650.

For a genuine CT secondary failure the magnitude of negative sequence current $I_2$ will change only on the side where current zero has been detected. The change in magnitude of $I_2$ ($\Delta I_2$) on other sets of the current transformer (other than where current zero is detected), if found to be unchanged for the healthy sets of CT, is treated as an indication of CT secondary failure.

Thus, the method detects the CT secondary failure without additional reference inputs but uses the healthy CT set also involved in the differential protection, as a reference. The method for CT secondary failure detection can comprise of:
 (a) determining current zero in at least one phase within a sub power cycle;
 (b) determining a change in negative sequence current change ($\Delta I2$) in at least one of the healthy reference CT sets;
 (c) comparing ($\Delta I2$) against predefined threshold; and
 (d) indicating the CT secondary failure when current zero is detected and the negative sequence change doesn't exceed the defined threshold limit.

Further, the working of the method is demonstrated along with simulation results/case illustrations.

For simulation purpose, an exemplary three winding transformer with rating 132 kV/11 kV/11 kV and type YN/yn/d1 is considered. The MVA rating is 30 MVA, with 21 MVA on secondary 1 (SEC_1) and 9 MVA on secondary 2 (SEC_2). The power transformer has secondary 1 with 10% loading, the load being 0.9% unsymmetrical.

Figure 2:
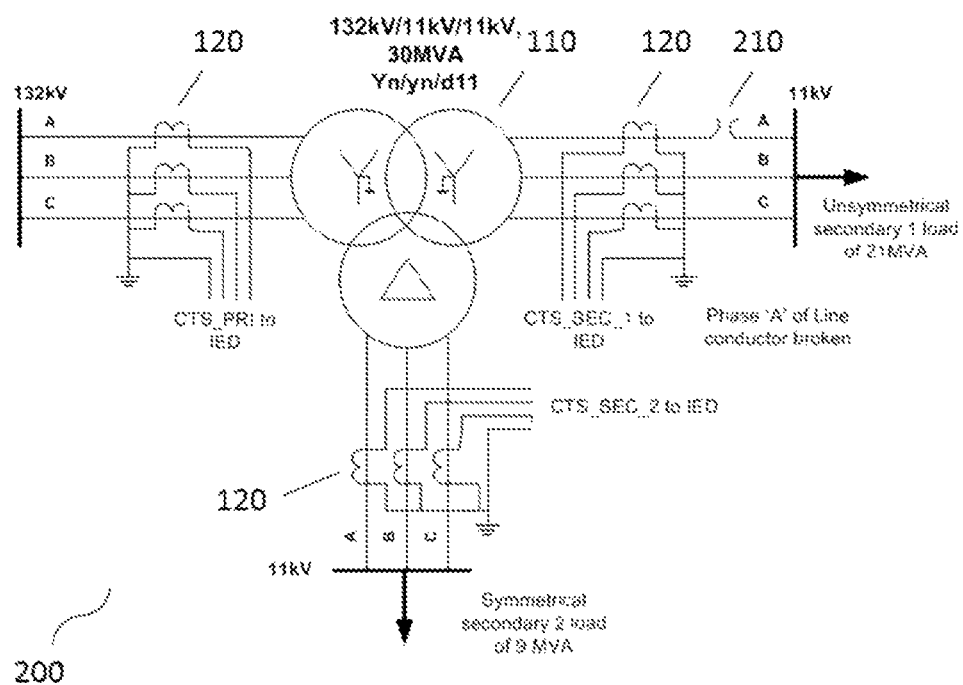
Figure 3:
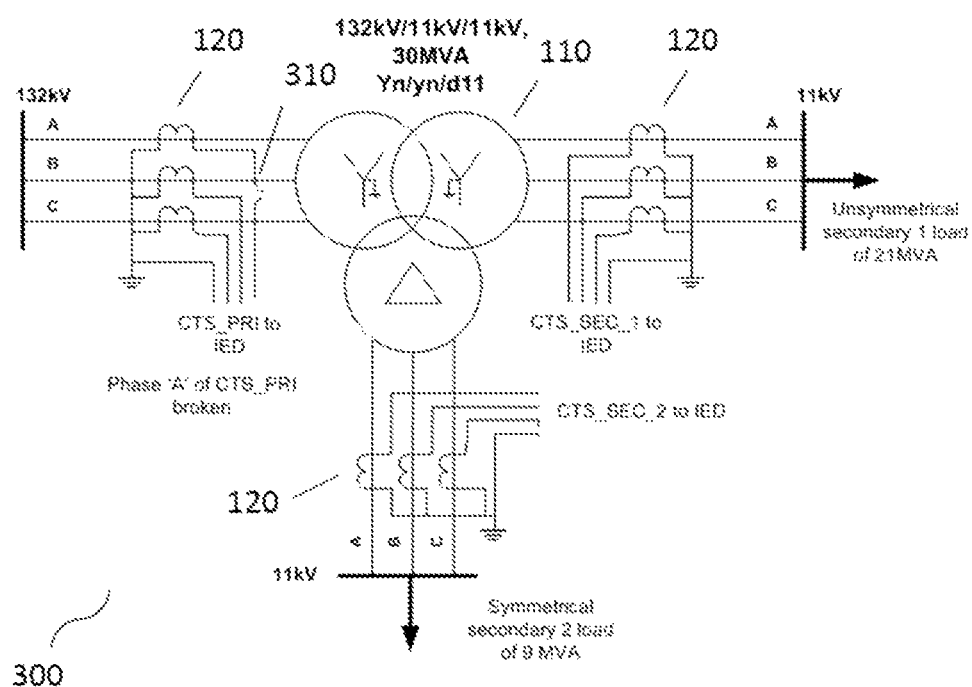
Figure 4:
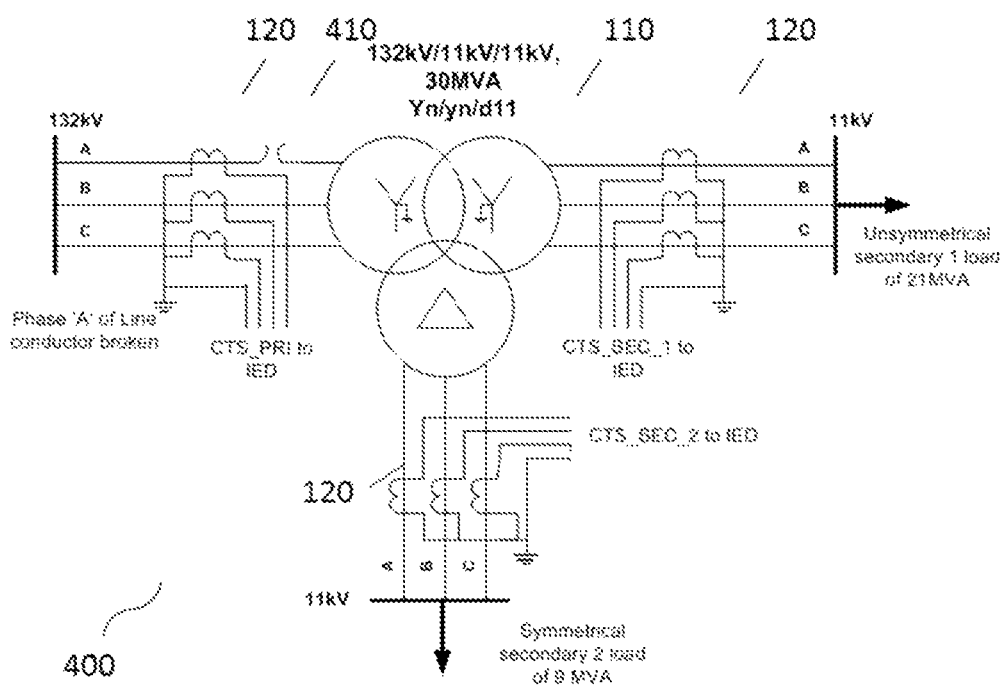

The following cases are illustrated as examples:
Case A)
 Fault condition:
  CT secondary failure 130 occurs on Phase 'A' of CTS_SEC_1 as shown in FIG. 1.
  The transformer is having load of 10% at the time when CT secondary failure happens on Phase 'A' of CTS_SEC_1. These will result into current zero in phase 'A' of CTS_SEC_1. However this being a CT secondary problem, false tripping should not result and the relay blocks tripping based on the method disclosed herein.
  As per the method described herein, on detection of current zero in phase 'A' of CTS_SEC_1, the change in negative sequence current is evaluated on healthy sets of CTs (e.g., on CTS_PRI and CTS_SEC_2). As current zero is due to CT secondary phase 'A' broken, no significant changes in negative sequence current (less than the pre-set threshold value) on CTS_PRI and CTS_SEC_2 are observed. The relay blocks a trip function.
Case B)
 Fault condition:
  Broken phase 'A' 210 on secondary 1 as shown in FIG. 2.
  If the current zero is due to a broken line conductor, this results in a change in a negative sequence current on CTS_PRI as well as on CTS_SEC_2 side at the instance of current zero. The instantaneous change is an indication of system failure and not the case of a CT secondary being open. The relay on detection of current zero detects significant change in a negative sequence current and executes the trip function (e.g., no blocking of the trip signal).
Case C)
 Fault condition:
  CT secondary failure 310 occurs on Phase 'A' of CTS_PRI as shown in FIG. 3.
  The transformer is having load of 10% at the time when CT secondary failure happens on Phase 'A' of CTS_PRI. This results into current zero in phase 'A' of CTS_PRI. However this being a CT secondary problem, false tripping should not result.
  As per the method described herein, the change in negative sequence current is further evaluated on healthy sets of CTs (e.g., on CTS_SEC_1 and CTS_SEC_2 on detection of current zero in phase 'A' of CTS_PRI). As current zero is due to CT secondary phase 'A' broken, no changes in a negative sequence current on CTS_SEC_1 and CTS_SEC_2 are observed (i.e., negative sequence current remains constant (less than the preset threshold) even after current zero occurrence in CTS_PRI). Based on this, the relay blocks the trip function.
Case D)
 Fault condition:
  Broken phase 'A' 410 on primary as shown in FIG. 4.
  As the current zero is due to a broken line conductor, this results in a change in negative sequence current on CTS_SEC_1 as well as on CTS_SEC_2 at the instance of current zero. The instantaneous change is an indication of system failure and not due to CT secondary open. The relay on detection of current zero and a change in negative sequence current, executes the trip function.

Thus, the method, as described through simple illustrations, provides that the system failure and CT failures are distinguishable based on the observations of current zero in the CT secondary and changes in the condition parameter, negative sequence current. The CT failures show no change (e.g., change less than preset threshold values) when current zero in CT secondary is observed.

Though the illustration was described based on the magnitude of current, it is indicated that the relay also computes changes in phase angles (e.g., a condition parameter) for all the three sets of CT. This can be specifically useful to confirm fault when the change in negative sequence current is small, which is a case when the loading of the transformer is small. Thus, more than one condition parameter may be computed by the relay.

Exemplary cases are illustrated for various loading of transformer (10% and 100% loading) by simulation.
Case 1: 100% Loading of Transformer
 For this case, the phase 'A' of the power transformer secondary gets open (phase discontinuity) as shown in FIG. 2, and the transformer is 100% loaded.
 The CT_SEC_1 would measure current as zero. The fault would cause an imbalance condition resulting in a change in negative sequence current. On the primary side, this asymmetry of secondary 1 gets reflected (e.g., for phase 'A' current magnitude changes compared to what it was before fault). Similarly depending upon the type of secondary 2 (Star, Y or Delta, D), the asymmetry of secondary 1 also will be reflected on secondary 2 (though for simplicity, this can be neglected). Eventually negative sequence current is detected on both CT_SEC2 and CT_PRI. The transformer being 100% loaded, the change in magnitude detected is of sufficient quantity for the IED to easily sense. Exemplary simulation results depict this change in CT_SEC2 to be approximately 13.2 A (=0.028 pu) and in CT_PRI to be approximately 46 Amp (=0.33 pu) which are detectable by the relay. In an exemplary worst case, the change in the CT_PRI side is detected and that is sufficient to indicate that the fault is a system fault and not the CT secondary circuit problem.

Case 2: 10% Loading of Power Transformer

For the case fault condition as in Case 1 (FIG. 2) but with 10% loaded condition for power transformer, the detection in the change in magnitude of the negative sequence current becomes difficult. From the simulation results, the negative sequence current on CT_SEC2 is approximately 1.32 A (=0.0028 pu) and that in the CT_PRI is approximately 4.6 A (=0.033 pu), which are difficult to detect (e.g., the change in negative sequence current in the healthy sets CT_SEC2 and CT_PRI is too small to measure, and the IED is likely to consider this as a CT secondary circuit problem and can operate improperly if the method is based only on a detected change in the magnitude.

As one can see from the presented simulated results, the method to detect change in negative sequence current should consider both the magnitude and the phase (i.e., the change in vector) for all the three sets of CT signals.

During an exemplary normal operating condition, a phase angle difference between healthy phases is 120 degrees. A system fault condition on Phase 'A' will result into a change in phase angle difference between phases 'B' and 'C'. This change in phase angle difference between healthy phases is evaluated in all three sets of current transformers, and if the change is detected in any set of CT, it is an indication of system failure.

For the fault condition illustrated in FIG. 2, the change in phase angle difference on CT_PRI (Phase B-Phase C) was observed in the simulation as approximately 17 degrees, which is measureable even when the transformer has a small load (e.g., 10% loading condition). For the CT secondary problem, no such shift in phase angle would result.

An exemplary method as disclosed herein can be algorithmically implemented in a differential protection relay that would block the differential protection relay to trigger a power trip signal using the method described herein in the invention in the case of CT secondary failure. Further the relay includes reset timer to not to allow a CT failure indication to be reset in case of an intermittent type of CT secondary failures.

The method may also be used in a dedicated apparatus/device deployed for supervision of faults in the CT sets.

In an exemplary embodiment, the protection relay measures current parameters (e.g., magnitude and phase) with current transformers electrically coupled at various terminals of multiphase power equipment. The relay computes negative sequence current from the measurements made at different terminals of the power equipment. On detection of current zero condition in any of the terminals, the protection relay looks for an abrupt change in the computed negative sequence current value to determine the health of the current transformer used for measurement of current at the terminal measuring current zero condition and that of the power equipment.

In another exemplary embodiment, the protection relay measures current parameters (e.g., magnitude and phase) with current transformers electrically coupled at various terminals of multiphase power equipment. The relay computes negative sequence current from the measurements made at different terminals of the power equipment. On detection of a current zero condition in any of the terminals, the protection relay looks for an abrupt change in the computed negative sequence current value to determine the health of the current transformer used for measurement of current at the terminal measuring current zero condition and that of the power equipment. In addition to the supervision of any abrupt change in the computed negative sequence current value, the relay can supervise the computed change in current phase angle with respect to a healthy current transformer to detect any abrupt change corresponding to the detection of current zero. Thus the relay can monitor multiple condition parameters to determine health of the current transformer reporting current zero condition.

In yet another exemplary embodiment, the protection relay measures current parameters (e.g., magnitude and phase) with current transformers electrically coupled at various terminals of multiphase power equipment. The relay computes one or more condition parameters based on, for example, the negative sequence current value, current phase angle and the power equipment loading factor (% loading of the power equipment). A suitable condition parameter may be selected as a fault indicative parameter based on the load condition in the power equipment. The fault indicative parameter may directly be the negative sequence current or the phase angle or a combination parameter derived as a mathematical function of negative sequence current and phase angle based on the loading factor.

In yet another exemplary embodiment, one or more condition parameters including a combination parameter derived as a mathematical function is provided as a combination parameter set. Thus, a combination parameter set is provided with one or more condition parameters including derived condition parameters as a fault indicative parameter. On detection of a current zero condition in any of the terminals, the protection relay looks for an abrupt change in the computed fault indicative parameter to determine the health of the current transformer used for measurement of current at the terminal measuring current zero condition and that of the power equipment. For determining the health state of power equipment in the electrical system, the condition parameters in the condition parameter set are compared with the preset threshold value corresponding to the condition parameter in the condition parameter set. One or more condition parameters in the condition parameter set may be selected based on the load condition of the multi-phase power equipment.

In another exemplary embodiment, the method covers a short circuit fault in any of the CT windings resulting in a fault condition. Here, the relay may make use of voltage signals for detection of faults. The relay computes negative sequence current/voltage as found suitable to distinguish the fault. The method described using the current signals in the embodiment is now based on voltage signals (e.g., on detection of current/voltage zero, the change in negative sequence voltage/current or the values of fault indicative parameter based on electrical parameters (current/voltage) is checked). If the change is significant, the fault is indicated as a system problem. It is to be noted that the method is capable of detecting short circuit or open circuit faults in the CT winding with measurement of current/voltage (electrical) parameters.

It is to be noted that protection principles of the present disclosure can easily be extended and applied for supervising current transformers in the protection of multi-winding power transformers or any other multi-phase power equipment component. The methods described herein may be partly or completely embedded in the relay, the relay functioning along with another computer device external to the relay. Also, the methods described herein can easily be extended to any current sensor for measurement of current.

While the present invention has been described in terms of preferred exemplary embodiments, the invention is not limited thereto, but can be embodied in various ways without departing from the principles described herein.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method for supervising a condition of electrical equipment in an electrical power system which includes plural current transformers for multi-phase power equipment, the multi-phase power equipment being protected by a protection relay which can issue of a trip signal on occurrence of a fault in the electrical power system, the method comprising:
   a) measuring electrical parameters from the plural current transformers for the multi-phase power equipment;
   b) computing a fault indicative parameter for the multi-phase power equipment in the electrical power system from the measurements made with the plural current transformers;
   c) detecting a fault condition in at least one electrical measurement made from the plural current transformers, wherein a current transformer indicating a fault condition is a suspected faulty current transformer and remaining current transformers of the plural current transformers are considered to be healthy current transformers;
   d) detecting a change in the computed fault indicative parameter from the at least one electrical parameter measurement made from at least one of the healthy current transformers on detection of the fault condition in the suspected faulty current transformer; and
   e) comparing the detected change in the computed fault indicative parameter with a preset threshold value for the fault indicative parameter to determine a condition of at least one electrical equipment component in the electrical power system;
   wherein the computing of the fault indicative parameter includes computing a condition parameter selected from a group consisting of: a negative sequence current parameter computed from measurements made with at least one healthy current transformer, a phase angle difference parameter computed from measurements between current signals from any two of the healthy current transformers, and a combination parameter set based on the negative sequence current parameter and the phase angle difference parameter.

2. The method of claim 1, wherein the measuring of electrical parameters comprises:
   measuring a magnitude and/or a phase angle of current signals from the plural current transformers.

3. The method of claim 2, wherein the detecting of a fault condition comprises:
   algorithmically detecting the fault condition within one fundamental power cycle.

4. The method of claim 3, wherein detecting a change in the computed fault indicative parameter comprises:
   comparing a present value of the fault indicative parameter with a previously stored fault indicative parameter value in a protection relay.

5. The method of claim 4, comprising:
   determining the preset threshold value automatically based on the computed fault indicative parameter value under normal conditions.

6. The method of claim 5, comprising:
   blocking the trip signal based on a result of a comparison of the change in the fault indicative parameter with the preset threshold value.

7. The method of claim 6, comprising:
   basing a selection of a condition parameter as a fault indicative parameter on a loading condition of the multi-phase power equipment.

8. The method of claim 1, wherein the detecting of a fault condition comprises:
   algorithmically detecting the fault condition within one fundamental power cycle.

9. The method of claim 1, wherein detecting a change in the computed fault indicative parameter comprises:
   comparing a present value of the fault indicative parameter with a previously stored fault indicative parameter value in a protection relay.

10. The method of claim 1, comprising:
    determining the preset threshold value automatically based on the computed fault indicative parameter value under normal operating conditions.

11. The method of claim 1, comprising:
    blocking the trip signal based on a result of a comparison of the change in the fault indicative parameter with the preset threshold value.

12. The method of claim 1, comprising:
    basing a selection of a condition parameter as a fault indicative parameter on a loading condition of the multi-phase power equipment.

13. A device for supervision of a condition of an electrical equipment in an electrical power system having plural current transformers and multi-phase power equipment, where the plural current transformers can measure current in the multi-phase power equipment, the device comprising:
    a) a current sensing module for measuring current parameters and for detecting a fault condition in measurements made from the at least one suspected faulty current transformer;
    b) a computation module for computing change in a fault indicative parameter value based on data from at least one healthy current transformer as provided by the current sensing module; and
    c) a comparator module for comparing a change in the fault indicative parameter with a preset threshold value to determine a condition of at least one electrical equipment component in the electrical power system;
    wherein the computation module is configured to compute a fault indicative parameter by computing a condition parameter selected from a group consisting of: a negative sequence current parameter computed using the at least one healthy current transformer, a phase angle difference parameter computed from measurements between current signals from any two healthy current transformers from among the plural current transformers, and a combination parameter set based on the negative sequence current parameter and the phase angle difference parameter.

14. The device of claim 13, comprising:
    a blocking module for blocking a trip signal generated for protection of multi-phase power equipment based on a result from the comparator module.

15. The device of claim 14, wherein the computation module is configured for selecting a condition parameter as a fault indicative parameter based on a loading condition of multi-phase power equipment.

16. The device of claim 13, wherein the computation module is configured for selecting a condition parameter as a fault indicative parameter based on a loading condition of multi-phase power equipment.

17. The device of claim 13, in combination with an electrical power system having plural current transformers and multi-phase power equipment.

* * * * *